No. 731,017. Patented June 16, 1903.

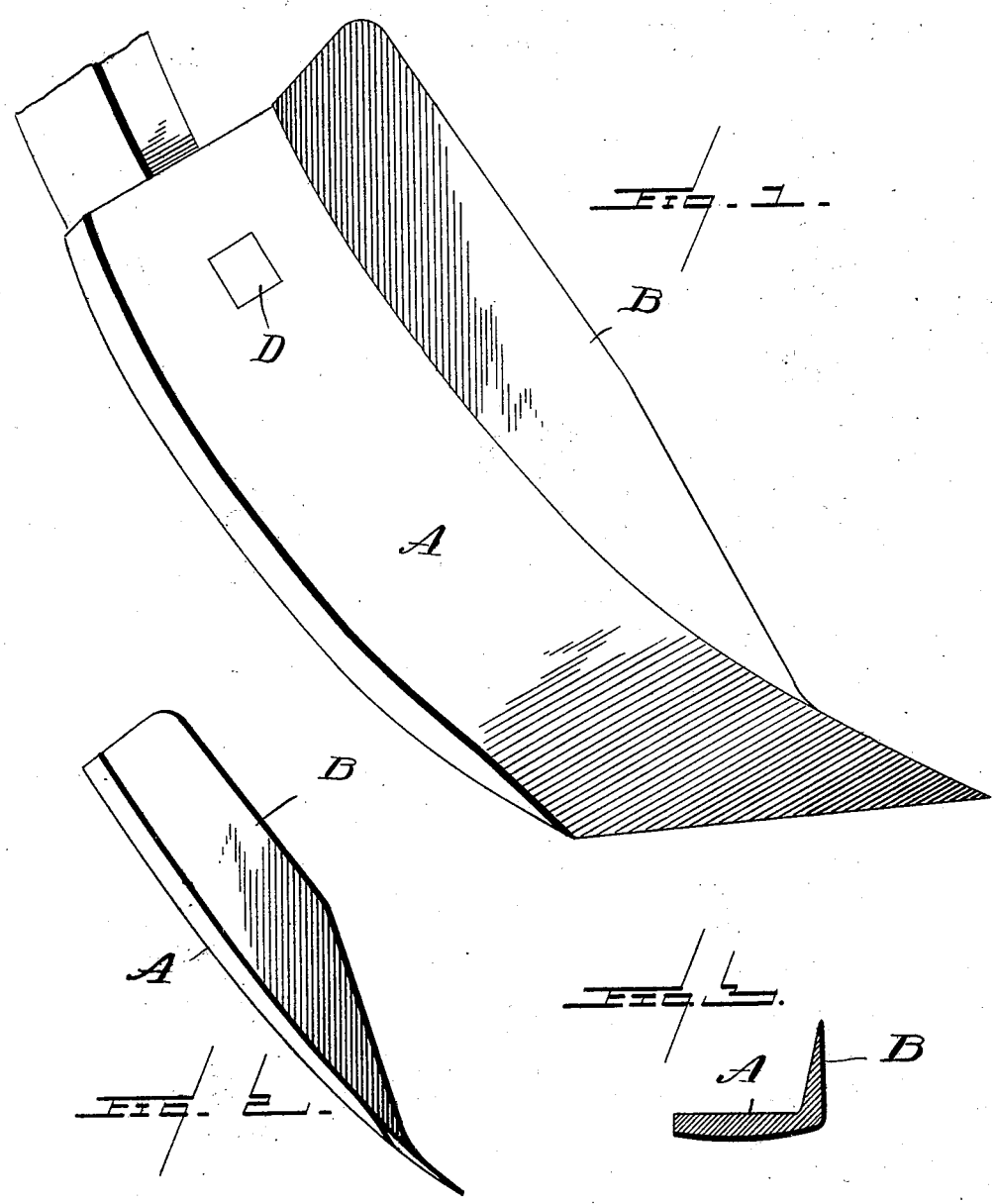

UNITED STATES PATENT OFFICE.

ENOS ALFRED BROOKS, OF YONAH, GEORGIA.

PLOW.

SPECIFICATION forming part of Letters Patent No. 731,017, dated June 16, 1903.

Application filed November 14, 1902. Serial No. 131,448. (No model.)

*To all whom it may concern:*

Be it known that I, ENOS A. BROOKS, a citizen of the United States, residing at Yonah, in the county of Hall and State of Georgia, have invented certain new and useful Improvements in Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in plows, and especially to an integral cutting-flange of the plow, adapted for cutting sod and subsoil, making the working of the ground more easy to the beast of burden.

The invention consists, further, in the novel construction and adaptation of the features of the plow, which will be hereinafter more fully described, and then specifically defined in the appended claim.

My invention is clearly illustrated in the accompanying drawings, which, with the letters of reference marked thereon, form a part of this application, and in which drawings—

Figure 1 is a perspective view of my improved plow with subsoil and sod cutting edge. Fig. 2 is a side view. Fig. 3 is a cross-sectional view through the plow.

Reference now being had to the details of the drawings by letter, A designates the plow proper, which is made with its lower face convexed and having its forward end tapering, as shown, and brought to a point. Along one edge of said plow proper is a flange B, disposed at right angles to the plow, and said flange, designed as a cutting edge, is brought to a sharp edge and tapers down toward the forward end of the plow, the extreme forward end of said tapering flange terminating a short distance behind the forward point of the plow. The rear end of said flange is preferably rounded, as shown.

Near the rear end of the plow is formed an aperture D, in which a support for the plow is adapted to be inserted and held, the other end of which may be attached in any suitable manner to a plow-beam.

By the provision of a plow embodying the features of my invention I produce a plow especially adapted to cut sod and rooty soil and particularly designed for working cotton-fields and by the use of which the dirt may be thrown away from the cotton, leaving the latter on a narrow ridge, allowing the sun to warm the roots, thereby causing it to grow more rapidly than when cultivated with ordinary plows.

Having thus described my invention, what I claim to be new, and desire to secure by Letters Patent, is—

A plow comprising a single piece of metal which is concaved longitudinally and adapted to be secured to the plow-beam, the opposite edges of said plow being parallel and at right angles to the opposite faces of the plow, the latter tapering from its rear to its forward end forming an inclined cutting edge intermediate the two parallel edges of the plow, the bottom of the plow being convexed, and a cutting-blade B integral with one of the edges of the plow and at right angles to the upper concaved face of the plow, said cutting-blade B inclined at substantially its middle portion forward and merging into the edge of the plow at a location substantially opposite the rear end of the forward cutting edge of the plow, the rear end of said cutting-blade being flush with the rear end of the plow and the inner face of the blade at an obtuse angle to the upper concaved face of the plow, as shown and described.

In testimony whereof I hereunto affix my signature in presence of two witnesses.

ENOS A. BROOKS.

Witnesses:
G. T. PURDY,
S. E. PURDY.